United States Patent
Nian et al.

(10) Patent No.: US 11,073,601 B2
(45) Date of Patent: Jul. 27, 2021

(54) VEHICLE POSITIONING SYSTEM USING LIDAR

(71) Applicant: BEIJING DIDI INFINITY TECHNOLOGY AND DEVELOPMENT CO., LTD., Beijing (CN)

(72) Inventors: Xing Nian, Beijing (CN); Lu Feng, Beijing (CN); Teng Ma, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 311 days.

(21) Appl. No.: 16/231,983

(22) Filed: Dec. 25, 2018

(65) Prior Publication Data
US 2020/0150233 A1    May 14, 2020

Related U.S. Application Data

(63) Continuation of application No. PCT/CN2018/114854, filed on Nov. 9, 2018.

(51) Int. Cl.
*G01S 7/48* (2006.01)
*G01S 17/42* (2006.01)
(Continued)

(52) U.S. Cl.
CPC ............ *G01S 7/4808* (2013.01); *G01S 17/42* (2013.01); *G01S 17/931* (2020.01)

(58) Field of Classification Search
CPC ..... G01C 21/30; G01C 21/3807; G01S 17/42; G01S 17/86; G01S 17/931; G01S 7/4808
(Continued)

(56) References Cited

U.S. PATENT DOCUMENTS 10,859,395 B2 * 12/2020 Wheeler ............... B60W 40/04
2015/0269438 A1    9/2015 Samarasekera et al.
(Continued)

FOREIGN PATENT DOCUMENTS

CN    105678689 A    6/2016
CN    107015238 A    8/2017
(Continued)

OTHER PUBLICATIONS

The Australian Examination Report in Australian Application No. 2018282435 dated Jun. 27, 2019, 6 pages.
(Continued)

*Primary Examiner* — John H Le
(74) *Attorney, Agent, or Firm* — Bayes PLLC

(57) ABSTRACT

Embodiments of the disclosure provide systems and methods for positioning a vehicle. The system includes a communication interface configured to receive a point cloud with respect to a scene captured by a sensor equipped on the vehicle. The system further includes a storage configured to store the point cloud and a high definition map. The system also includes a processor. The processor is configured to create a first 3-D representation of the point cloud and create a second 3-D representation of the high definition map with respect to the scene. The processor is further configured to determine pose information of the vehicle by comparing the first 3-D representation and the second 3-D representation. The processor determines a position of the vehicle based on the pose information.

18 Claims, 5 Drawing Sheets

(51) Int. Cl.
*G01S 17/93* (2020.01)
*G01S 17/931* (2020.01)

(58) Field of Classification Search
USPC .......................................................... 702/152
See application file for complete search history.

(56) References Cited

U.S. PATENT DOCUMENTS

| | | | |
|---|---|---|---|
| 2016/0368505 A1* | 12/2016 | Sorstedt | G05D 1/0088 |
| 2017/0193312 A1* | 7/2017 | Ai | G06F 13/20 |
| 2018/0058861 A1* | 3/2018 | Doria | G01S 7/4808 |
| 2018/0190016 A1 | 7/2018 | Yang | |
| 2019/0226853 A1* | 7/2019 | Kubiak | G06T 3/0043 |

FOREIGN PATENT DOCUMENTS

| | | |
|---|---|---|
| CN | 107796374 A | 3/2018 |
| CN | 108225341 A | 6/2018 |
| EP | 3 078 935 A1 | 10/2016 |
| EP | 3579215 A1 | 12/2019 |
| JP | 2008309533 A | 12/2008 |
| WO | 2014201075 A1 | 12/2014 |
| WO | 2017155970 A1 | 9/2017 |
| WO | 2018180338 A1 | 10/2018 |

OTHER PUBLICATIONS

International Search Report in PCT/CN2018/114854 dated Aug. 15, 2019, 6 pages.
Written Opinion in PCT/CN2018/114854 dated Aug. 15, 2019, 4 pages.
The Office Action in Canadian Application No. 3028286 dated Feb. 19, 2020, 4 pages.
Extended European Search Report issued in corresponding European Application No. 18 815 100.5, dated Nov. 3, 2020, 8 pages.
Notice of Rejection issued in counterpart Japanese Application No. 2018-567033, dated Feb. 15, 2021, 3 pages.
First Examination Report issued in corresponding India Application No. 201817048650, dated Mar. 9, 2021, 7 pages.

* cited by examiner

VEHICLE POSITIONING SYSTEM USING LIDAR

CROSS-REFERENCE TO RELATED APPLICATIONS

This application claims priority to International Application No. PCT/CN2018/114854, filed on Nov. 9, 2018, designating the United States of America, the contents of which are incorporated herein by reference.

TECHNICAL FIELD

The present disclosure relates to positioning systems and methods using Light Detection and Ranging (LiDAR), and more particularly to, positioning systems and methods for estimating a position of a vehicle using a voxel matching method between LiDAR data and a high definition map.

BACKGROUND

Autonomous driving and robotic navigation technologies rely heavily on accurate positioning. For example, positioning the vehicle with high definition is critical to autonomous driving. Conventional positioning methods, such as using a Global Positioning System (GPS) or an Inertial Measurement Unit (IMU), do not provide sufficient positioning accuracy required by autonomous driving. For example, the accuracy of GPS positioning is typically on the order of meters. It is oftentimes not precise enough for automatons driving controls, such as to position the vehicle between lanes, or to position a pedestrian in front of the vehicle, both of which will require positioning error to be within centimeters. In addition, GPS signals are not always available. For example, GPS signals are often weak or lost when the vehicle is inside a tunnel or near high-rise buildings. Moreover, measurement errors by an IMU usually accumulate over time or distance, resulting in positioning inaccuracies.

High-resolution maps may be obtained by aggregating images and information acquired by various sensors, detectors, and other devices on vehicles as they travel around. For example, a vehicle may be equipped with multiple integrated sensors such as a LiDAR, a GPS receiver, one or more IMU sensors, and one or more cameras, to capture features of the road on which the vehicle is travelling or the surrounding objects. High-definition maps may be obtained by aggregating multiple point cloud frames based on their corresponding three-dimensional (3-D) pose information (e.g., positions and orientations) of a survey vehicle.

Based on the high definition map, the vehicle may be positioned by feature matching and fusing with real-time sensor measurements, such as camera images, and GPS/IMU signals. However, positioning results are often affected by, for example, lighting conditions when a camera image is taken, and noises in sensor measurements. Another high definition positioning method matches real-time point clouds captured by LiDAR with the high definition map, point-to-point. However, such a method is computationally expensive given the amount of data need to be processed and the complexity of the algorithm. In addition, it requires an initial position that is sufficiently close to the actual position of the vehicle. Another method segments the point cloud, extracts features from the segments, and matches the features with those features extracted from the high definition map. This method usually cannot be performed in real-time and is sensitive to measurement noises.

Embodiments of the disclosure address the above problems by improved systems and methods for position a vehicle.

SUMMARY

Embodiments of the disclosure provide a system for positioning a vehicle. The system includes a communication interface configured to receive a point cloud with respect to a scene captured by a sensor equipped on the vehicle. The system further includes a storage configured to store the point cloud and a high definition map. The system also includes a processor. The processor is configured to create a first 3-D representation of the point cloud and create a second 3-D representation of the high definition map with respect to the scene. The processor is further configured to determine pose information of the vehicle by comparing the first 3-D representation and the second 3-D representation. The processor determines a position of the vehicle based on the pose information.

Embodiments of the disclosure also provide a method for positioning a vehicle. The method includes receiving a point cloud with respect to a scene captured by a sensor equipped on the vehicle. The method further includes creating, by a processor, a first 3-D representation of the point cloud and creating, by the processor, a second 3-D representation of a high definition map with respect to the scene. The method also includes determining, by the processor, pose information of the vehicle by comparing the first 3-D representation and the second 3-D representation and determining a position of the vehicle based on the pose information.

Embodiments of the disclosure further provide a non-transitory computer-readable medium having instructions stored thereon that, when executed by one or more processors, causes the one or more processors to perform operations. The operations include receiving a point cloud with respect to a scene captured by a sensor equipped on the vehicle. The operations further include creating a first 3-D representation of the point cloud and creating a second 3-D representation of a high definition map with respect to the scene. The operations also include determining pose information of the vehicle by comparing the first 3-D representation and the second 3-D representation and determining a position of the vehicle based on the pose information.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
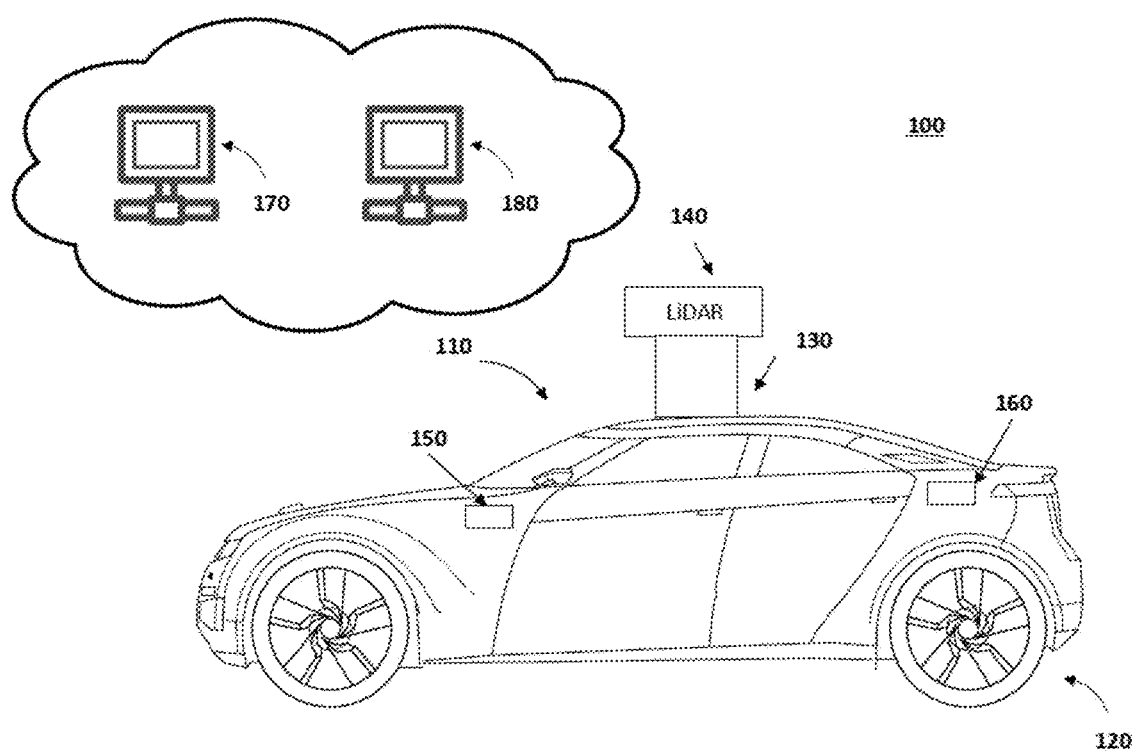
FIG. 1 illustrates a schematic diagram of an exemplary vehicle having sensors, according to embodiments of the disclosure.

FIG. 1 illustrates a schematic diagram of an exemplary vehicle 100 having a plurality of sensors, according to embodiments of the disclosure. Consistent with some embodiments, vehicle 100 may be a survey vehicle configured for acquiring data for constructing a high-resolution map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with LiDAR 140 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with GPS/IMU 150 inside or outside body 110 using any suitable mounting mechanisms. It is contemplated that the manners in which LiDAR 140 or GPS/IMU 150 can be equipped on vehicle 100 are not limited by the example shown in FIG. 1, and may be modified to achieve desirable sensing performance.

In some embodiments, LiDAR 140 and GPS/IMU 150 may be configured to capture data as vehicle 100 moves along a trajectory. Consistent with the present disclosure, LiDAR 140 can be configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high resolution, a LiDAR scanner is particularly suitable for high-resolution map surveys. In some embodiments, a LiDAR scanner may capture a point cloud. As vehicle 100 moves along the trajectory, LiDAR 140 may acquire a series of point clouds at multiple time points (each known as a point cloud frame acquired at a time point).

As illustrated in FIG. 1, vehicle 100 may be additionally equipped with GPS/IMU 150, which may include sensors used in a navigation unit for positioning of vehicle 100, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, GPS/IMU 150 can provide real-time pose data of vehicle 100 as it travels, including the positions and orientations (e.g., Euler angles) of vehicle 100 at each time point.

Consistent with the present disclosure, vehicle 100 may include a local controller 160 inside body 110 of vehicle 100 in communication with a map server 170 and a positioning server 180. In some embodiments, each of map server 170 and positioning server 180 may be a local physical server, a cloud server (as illustrated in FIG. 1), a virtual server, a distributed server, or any other suitable computing device. Map server 170 and positioning server 180 may communicate with LiDAR 140, GPS/IMU 150, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™). For example, map server 170 and positioning server 160 may receive sensor measurements from LiDAR 140 and GPS/IMU 150. Map server 170 and positioning server 180 may also communicate with each other. For example, positioning server 180 may receive high definition maps or certain portions thereof from map server 170.

Consistent with the present disclosure, controller 160 and positioning server 180 may individually or collectively perform estimation of pose information of vehicle 100 based on point clouds captured by LiDAR 140 and pose data captured by GPS/IMU 150. In some embodiments, controller 160 or positioning server 180 may retrieve a high definition map from map server 170 based on initial position information provided by GPS/IMU 150, and create a 3-D representation of the high definition map. Controller 160 or positioning server 180 may also receive a point cloud acquired by LiDAR 140 and create a 3-D representation of the point cloud. 3-D representations of the point cloud and the high definition map may be created by "voxelizing" the data. Controller 160 or positioning server 180 may perform a voxel matching method to the 3-D representations to optimize pose information of vehicle 100. Vehicle 100 may be positioned based on the optimized pose information. In some embodiments, the point cloud and high definition map may be voxelized at multiple resolutions, and the voxel matching method may be performed on 3-D representations at lower resolutions first and use the obtained pose information as initial guess when the method is performed on 3-D representations at higher resolutions. The disclosed systems and methods provide improved accuracy and reduced computational cost.

Figure 2:
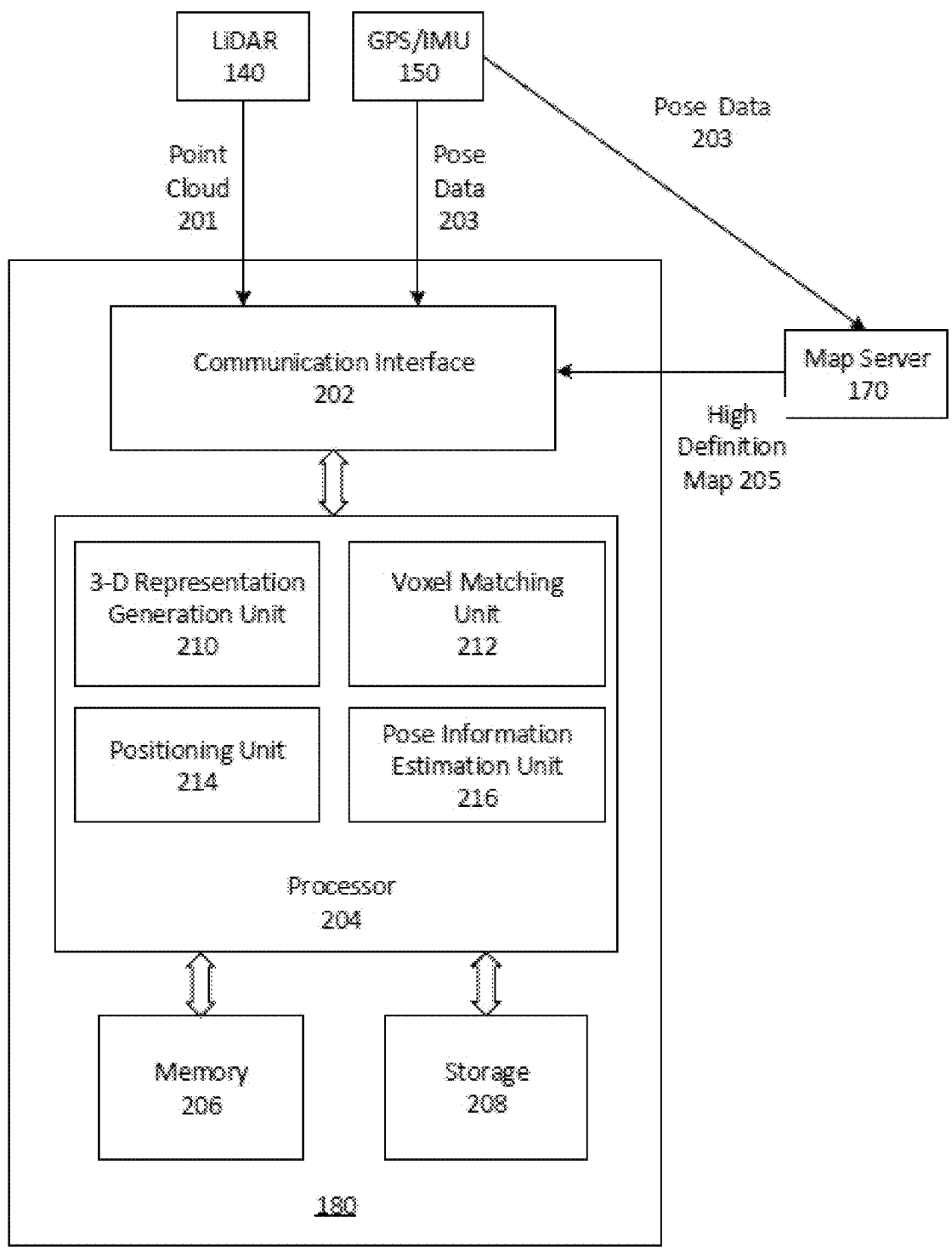
FIG. 2 illustrates a block diagram of an exemplary positioning server for positioning a vehicle based on real-time point cloud data, according to embodiments of the disclosure.

For example, FIG. 2 illustrates a block diagram of an exemplary positioning server 180 for positioning a vehicle based on real-time point cloud data, according to embodiments of the disclosure. Consistent with the present disclosure, positioning server 180 may use various types of data for vehicle pose estimation. The various types of data may be captured by LiDAR 140 and GPS/IMU 150 equipped on vehicle 100 with respect to a surrounding scene of vehicle 100, as vehicle 100 moves along a trajectory. The data may include a point cloud 201 captured by LiDAR 140 consisting of multiple point cloud frames at various time points. The data may also include initial pose data 203 of vehicle 100 acquired by GPS/IMU 150. In some embodiments, point cloud 201 may be calibrated by transforming the native LiDAR data from a local coordinate system into a global coordinate system (e.g., the longitude/latitude coordinates) based on initial pose data 203 from the GPS receiver and IMU sensors.

Data provided to positioning server 180 for vehicle pose estimation further includes a high definition map 205 provided by map server 170. High definition map 205 may be constructed by aggregating images and information acquired by various sensors, detectors, and other devices on a survey vehicle dispatched to capture features of a survey area. In some embodiments, high definition map 205 may be a portion of a larger high definition map, e.g., a local high definition map. Map server 170 may also receive pose data 203 from GPS/IMU 150, and retrieve high definition map 205 of a scene corresponding to pose data 203.

In some embodiments, as shown in FIG. 2, positioning server 180 may include a communication interface 202, a processor 204, a memory 206, and a storage 208. In some embodiments, positioning server 180 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of positioning server 180 may be located inside vehicle 100 or may be alternatively in a mobile device, in the cloud, or another remote location. Components of positioning server 180 may be in an integrated device, or distributed at different locations but communicate with each other through a network (not shown). For example, processor 204 may be a processor on-board vehicle 100, a processor inside a mobile device, or a cloud processor, or any combinations thereof.

Communication interface 202 may send data to and receive data from components such as LiDAR 140 and GPS/IMU 150, and map server 170 via, e.g., communication cables, a Wireless Local Area Network (WLAN), a Wide Area Network (WAN), wireless networks such as a radio wave network, a cellular network, and/or a local wireless network (e.g., Bluetooth™ or WiFi™), or other communication methods. In some embodiments, communication interface 202 can be an integrated services digital network (ISDN) card, a cable modem, a satellite modem, or a modem to provide a data communication connection. As another example, communication interface 202 can be a local area network (LAN) adaptor to provide a data communication connection to a compatible LAN. Wireless links can also be implemented by communication interface 202. In such an implementation, communication interface 202 can send and receive electrical, electromagnetic or optical signals that carry digital data streams representing various types of information.

Consistent with some embodiments, communication interface 202 may receive data captured by LiDAR 140 and GPS/IMU 150, including point cloud 201 and initial pose data 203. Communication interface 202 may additionally receive high definition map 205 from map server 170. The received data may be provided to memory 206 and/or storage 208 for storage or to processor 204 for processing. Communication interface 202 may also receive optimized pose information generated by processor 204, and provide the pose information to any local component in vehicle 100 or any remote device via a communication link.

Processor 204 may include any appropriate type of general-purpose or special-purpose microprocessor, digital signal processor, or microcontroller. Processor 204 may be configured as a separate processor module dedicated to estimating vehicle pose. Alternatively, processor 204 may be configured as a shared processor module that can also perform other functions unrelated to vehicle pose estimation.

As shown in FIG. 2, processor 204 may include multiple modules/units, such as a 3-D representation generation unit 210, a voxel matching unit 212, a positioning unit 214, a pose information estimation unit 216, and the like. These modules/units (and any corresponding sub-modules or sub-units) can be hardware units (e.g., portions of an integrated circuit) of processor 204 designed for use with other components or to execute at least part of a program. The program may be stored on a computer-readable medium, and when executed by processor 204, it may perform one or more functions or operations. Although FIG. 2 shows units 210-216 all within one processor 204, it is contemplated that these units may be distributed among multiple processors located closely to or remotely from each other.

Figure 3:
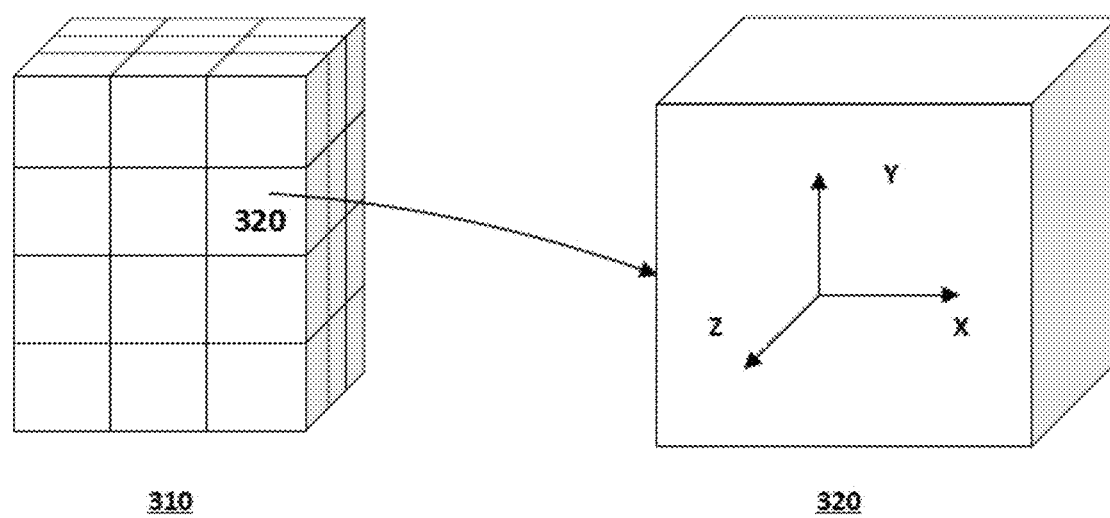
FIG. 3 illustrates an exemplary 3-D representation of point cloud data, according to embodiments of the disclosure.

3-D representation generation unit 210 may be configured to create a 3-D representation of point cloud 201. In some embodiments, 3-D representation generation unit 210 may divide the 3-D space of point cloud 201 into a number of voxels. For example, FIG. 3 illustrates an exemplary 3-D representation 310 of point cloud 201, according to embodiments of the disclosure. As shown in FIG. 3, 3-D representation 310 contains a plurality of voxels 320. Each voxel is characterized by a set of voxel values, including, e.g., local 3-D surface feature distributions. In some embodiments, the voxel values also include an average intensity value, and its 3-D distributions along the x, y, and z directions. For example, the 3-D distribution of the intensity value may be a Gaussian/Normal distribution.

Accordingly, voxel 320 may include 3-D spatial information as well as point cloud intensity distribution. Compared with methods that match the point cloud directly, matching the 3-D representations that contain such voxels can improve the positioning accuracy.

In some embodiments, 3-D representation unit 210 can further be configured to create a second 3-D representation, namely a 3-D representation of at least part of high definition map 205. High definition map 205 may contain point cloud data acquired during survey. Therefore, the 3-D representation of high definition map 205 can be created using the same method disclosed above in connection with FIG. 3.

Referring back to FIG. 2, voxel matching unit 212 may be configured to perform voxel matching operations between a 3-D representation of point cloud 201 and a corresponding 3-D representation of high definition map 205. In some embodiments, voxel matching may find the optimized pose information of vehicle 100 that corresponds to a minimum difference between the 3-D representation of point cloud 201 and a corresponding 3-D representation of high definition map 205. For example, the difference can be calculated as an aggregated difference of the differences between corresponding voxels of the two representations. In some embodiments, the difference can also be characterized conversely by a similarity between the voxels of the two representations. Voxel matching unit 212 can solve an optimization problem to maximize this similarity. Iterative methods, such as a Newton iterative method, may be implemented for solving the optimization problem.

In some embodiments, initial pose information $T_0$ may be used as a starting point (also known as an initial guess) for the first iteration when solving the optimization problem. For example, $T_0=(x_0, y_0, z_0, row_0, pitch_0, yaw_0)$, where $x_0$, $y_0$, and $z_0$ are the three-dimensional coordinates of the vehicle position, and $row_0$, $pitch_0$, and $yaw_0$ indicate the vehicle pose. The 3-D representations can be created initially based on the initial pose information $T_0$.

In some embodiments, $T_0$ may be estimated by pose information estimation unit 216 using the pose information obtained for the previous point cloud frame. During the optimization process, pose information T can be iteratively refined within a predefined search space X, Y, Z, ROLL, PITCH, YAW. The optimized pose T can be obtained after the optimization cost function satisfies certain predetermined stopping criteria. For example, the stopping criteria may include a matching maximum value Thm and/or a computing time maximum value Tht. If a similarity L exceeds Thm (i.e., the similarity between the corresponding voxels of point cloud data 201 and high definition map 205 is larger than Thm), or the computing time exceeds Tht, the iterative process may stop and the last updated pose information may be used as the optimized point cloud pose information T associated with the current point cloud frame.

In some embodiments, after the point cloud pose information T is available, positioning unit 214 may then merge the point cloud pose information T obtained by voxel matching unit 212 with initial pose data 203 provided by GPS/IMU 150. For example, the point cloud pose information T and initial pose data 203 may be merged using an Unscented Kalman Filter (UKF) method to generate a filtered pose information T'. The UKF method uses a deterministic sampling technique known as the Unscented Transform (UT) to pick a minimal set of sample points (called sigma points) around the posterior mean. The sigma points are then propagated through nonlinear functions, from which a new posterior mean and covariance estimate are then formed. The resulting UKF filter can more accurately estimate the true mean and covariance. Compared with the Extended Kalman Filter (EKF), which has been used by some existing navigation systems for pose estimation, UKF has the advantage of not computing Jacobians and thus theoretically superior on nonlinearity and spread of the prior state uncertainty. Consistent with the present disclosure, positioning unit 214 may position vehicle 100 using the filtered pose information T'.

In some embodiments, pose information estimation unit 216 may estimate the initial pose information $T_0$ for the next point cloud frame based on the filtered pose information T' determined for the current point cloud frame by positioning unit 214. In some embodiments, pose information estimation unit 216 may estimate $T_0$ based on a pose change between the point cloud frames. For example, pose information estimation unit 216 may calculate the pose change between adjacent point cloud frames based on the 3-D coordinates of the points and their associated attributes (e.g., reflected laser intensity) in each point cloud frame. As another example, pose information estimation unit 216 may calculate the pose change between pose data 203 obtained corresponding to the point cloud frames.

The estimated initial pose information $T_0$ may be provided to voxel matching unit 212 for estimating the optimized pose information T for the next point cloud frame. Because initial pose information $T_0$ is estimated based on the optimized T for the current point cloud frame, it is sufficiently accurate as an initial guess and thus may help the optimization process to converge quickly.

In some embodiments consistent with the present disclosure, point cloud 201 and high definition map 205 can be voxelized at different resolutions. For example, 3-D representation generation unit 210 can generate multiple 3-D representations for point cloud 201 with voxels 320 in different sizes in the respective 3-D representations. When multi-resolution voxelization is implemented by 3-D representation generation unit 210, the 3-D representations of corresponding point cloud and high definition map used by voxel matching unit 212 for matching operations are at the same resolution.

In some embodiments, 3-D representation generation unit 210 can generate 3-D representations of point cloud 201 and high definition map 205 at a first resolution $R_1$ first. $R_1$ can be a relatively low resolution, i.e., the 3-D representations having relatively large voxel sizes. Voxel matching unit 212 and positioning unit 214 may position vehicle 100 based on the low resolution 3-D representations first. The pose information obtained at resolution $R_1$ may be a rough estimation of the vehicle's position. 3-D representation generation unit 210 can then generate 3-D representations of point cloud 201 and high definition map 205 at a second resolution $R_2$ that is higher than resolution $R_1$. When using the 3-D representations at resolution $R_2$ to position the vehicle, the estimated pose information at resolution $R_1$ will be used as an initial guess.

As the estimation process is repeated at higher and higher resolutions, the accuracy of the estimated position of vehicle 100 can also be improved. Because the pose information estimated at a lower resolution may provide a sufficiently accurate initial guess, the multi-resolution voxelization approach can save a significant number of iterations required before the process converges, and thus improves the computational speed.

Memory 206 and storage 208 may include any appropriate type of storage device provided to store any type of information that processor 204 may need to process. Memory 206 and storage 208 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform vehicle pose estimation functions disclosed herein. For example, memory 206 and/or storage 208 may be configured to store program(s) that may be executed by processor 204 to control LiDAR 140 and/or GPS/IMU 150 to capture various types of data when vehicle 100 moves along a trajectory, and process the captured data to estimate the pose information of vehicle 100.

Memory 206 and/or storage 208 may be further configured to store information and data used by processor 204. For instance, memory 206 and/or storage 208 may be configured to store the various types of data captured by LiDAR 140 and GPS/IMU 150 and the estimated pose information. The various types of data may be stored permanently, removed periodically, or disregarded immediately after each frame of data is processed.

Figure 4:
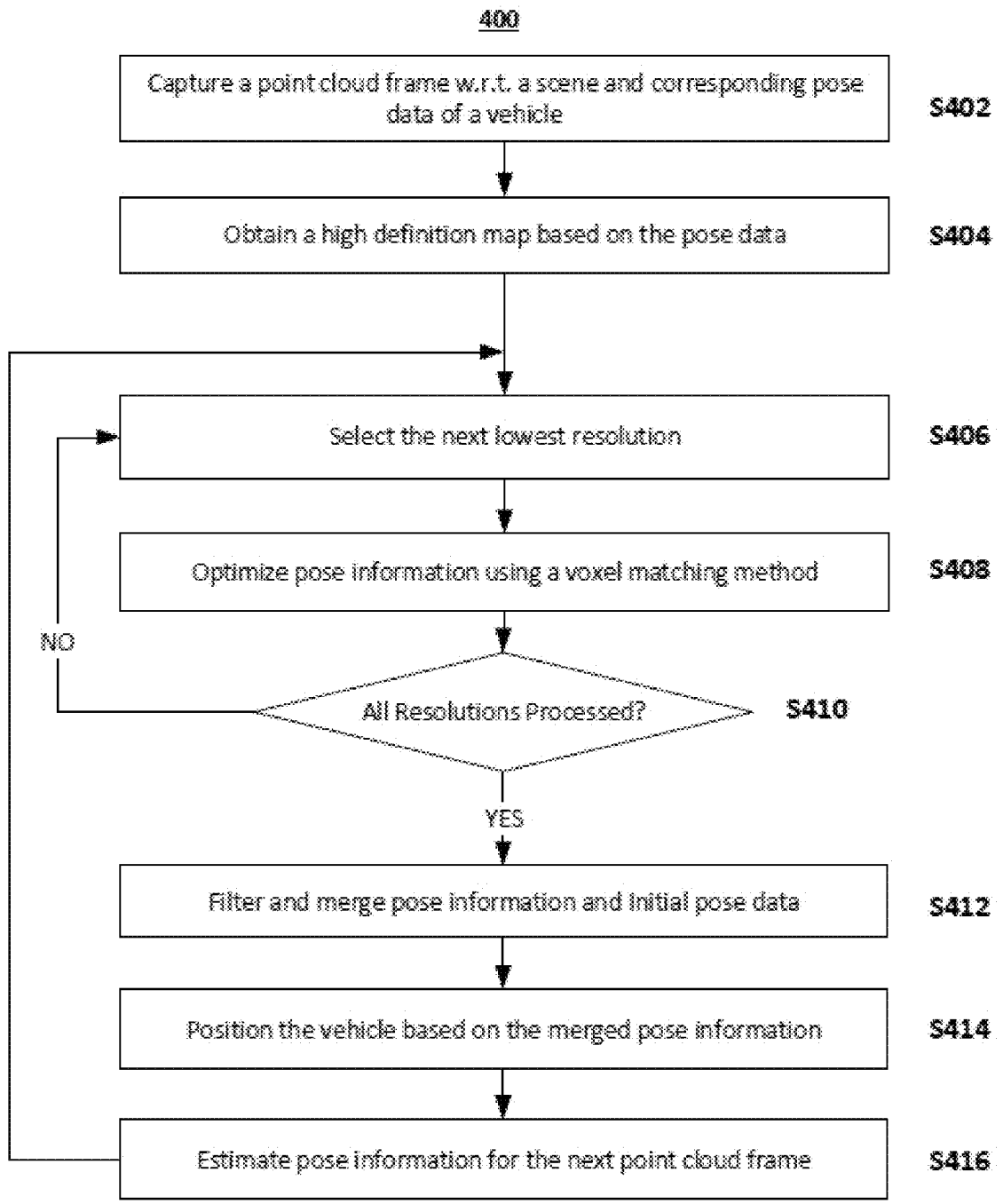
FIG. 4 illustrates a flowchart of an exemplary method for positioning a vehicle, according to embodiments of the disclosure.

FIG. 4 illustrates a flowchart of an exemplary method 400 for positioning vehicle 100, according to embodiments of the disclosure. For example, method 400 may be implemented by a vehicle pose estimation system of vehicle 100 that includes, among other things, controller 160, map server 170, positioning server 180, and LiDAR 140 and GPS/IMU 150. However, method 400 is not limited to that exemplary embodiment.

Method 400 may include steps S402-S416 as described below. It is to be appreciated that some of the steps may be optional to perform the disclosure provided herein. Further, some of the steps may be performed simultaneously, or in a different order than shown in FIG. 4.

In step S402, a point cloud frame $PC_1$ (e.g., point cloud 201) may be captured with respect to a scene at time point $t_1$. For example, point cloud frame $PC_1$ may be captured by LiDAR 140. In some embodiments, initial pose data $IP_1$ (e.g., initial pose data 203) of vehicle 100 may also be captured at time point $t_1$. For example, initial pose data $IP_1$ may be captured by GPS/IMU 150. Initial pose data $IP_1$ may correspond to point cloud frame $PC_1$ as they are captured at the same time point. In some embodiments, the captured initial pose data $IP_1$ and point cloud frame $PC_1$ may be sent to and received by positioning server 180.

In step S404, a high definition map (e.g., high definition map 205) may be obtained from map server 170 based on initial pose data $IP_1$. Initial pose data $IP_1$ provides a rough position of its corresponding point cloud frame $PC_1$, so that map server 170 can select a relevant portion of the high definition map previously constructed, for example, a portion of the high definition map that includes the scene. In some embodiments, the high definition map may also be received by positioning server 180.

In steps S406-S410, positioning server 180 may optimize pose information T of vehicle 100 using a voxel matching method. To optimize the pose information T, positioning sensor 180 may search a predefined space X, Y, Z, ROLL, PITCH, YAW to match the point cloud frame $PC_1$ obtained in step S402 with the point cloud data of the high definition map obtained in step S404. Consistent with the present disclosure, positioning server 180 may generate 3-D representations of the point cloud frame $PC_1$ and corresponding point cloud data of the high definition map, and determine an optimized estimated pose that reduces a difference between the two 3-D representations.

In some embodiments, positioning server 180 may perform voxel matching at multiple resolutions, such as $R_1$ and $R_2$, where resolution $R_2$ is higher than resolution $R_1$. When a multi-resolution approach is used, voxel matching can be performed between the first 3-D representation (e.g., 3-D representation of the point cloud frame) and the second 3-D representing (e.g., 3-D representation of the high definition map) at the same resolution. In some embodiments, voxel matching may be performed from lower resolutions to higher resolutions. For example, the lowest resolution may be used to perform the pose information optimization operations in S408. Then, in step S410, it is determined if all resolutions have been processed. If not, the process of method 400 returns to step S406, in which the next lowest resolution is selected for voxel matching (initially, the "next" lowest resolution can be the lowest resolution, e.g., $R_1$). In step S408, positioning server 180 may perform voxel matching of the 3-D representations of the point cloud frame and the high definition map at the selected resolution.

Figure 5:
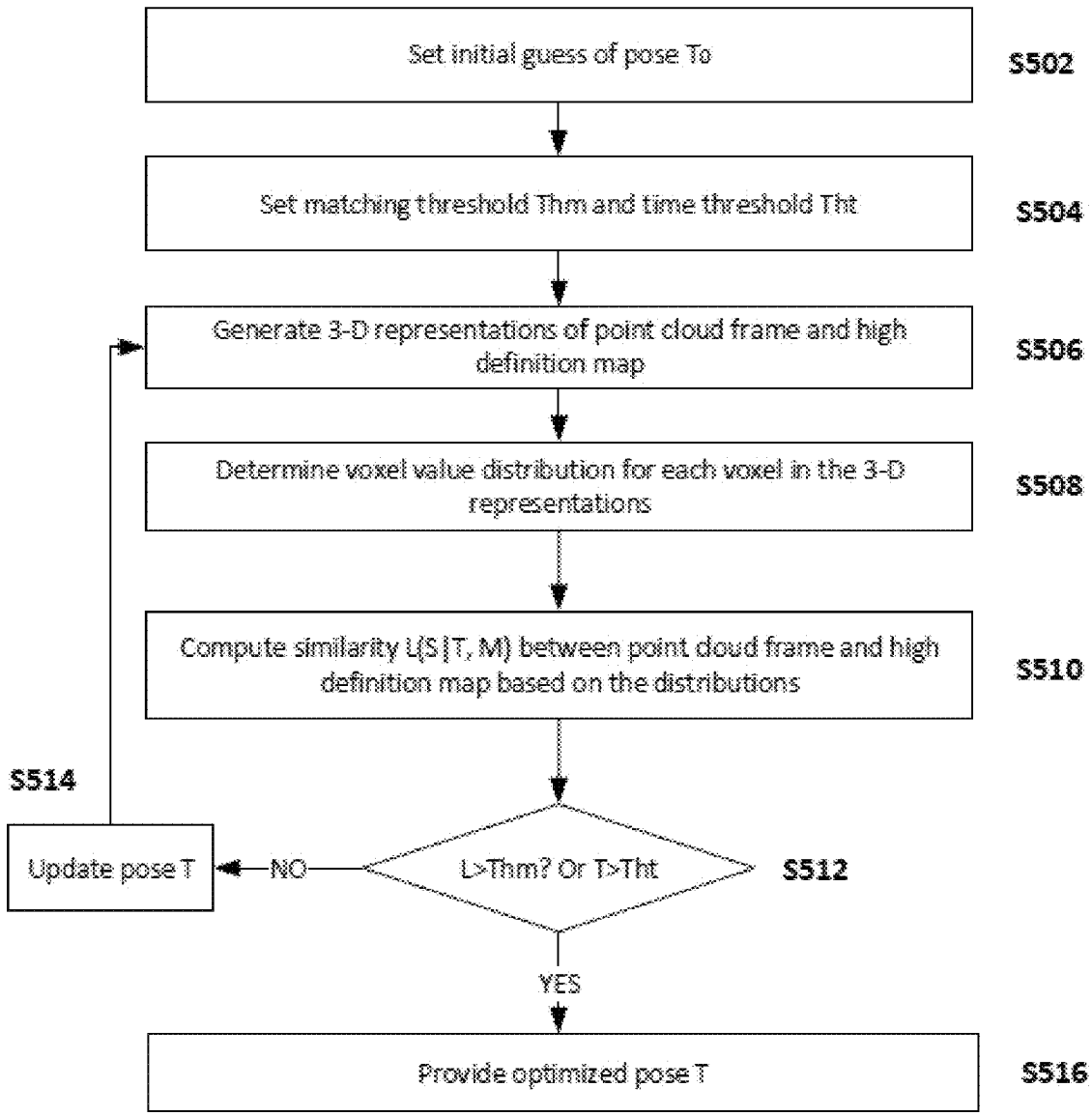
FIG. 5 illustrates a flowchart of an exemplary voxel matching method, according to embodiments of the disclosure.

FIG. 5 illustrates a flowchart of an exemplary voxel matching method 500, according to embodiments of the disclosure. Method 500 may be implemented by positioning server 180 to perform step S408 of method 400. However, step S408 is not limited to the implementation of method 500. Method 500 may include steps S502-S516, as described below. It is to be appreciated that some of the steps may be optional to perform the disclosure provided herein. Further, some of the steps may be performed simultaneously, or in a different order than shown in FIG. 5.

In step S502, pose $T_0$ can be set as an initial guess of pose information T. For example, $T_0=(x_0, y_0, z_0, row_0, pitch_0, yaw_0)$, where $x_0$, $y_0$, and $z_0$ are the three-dimensional coordinates of the vehicle position, and $row_0$, $pitch_0$, and $yaw_0$ indicate the vehicle pose. In some embodiments, $T_0$ may be estimated by pose information estimation unit 216 using the pose information obtained for the previous point cloud frame (e.g., $PC_0$ corresponding to time point $t_0$). When a multi-resolution approach is used, the optimized pose information at a lower resolution can be used as the initial pose $T_0$ to improve the computation speed.

In step S504, matching threshold Thm and time threshold Tht can be set. In some embodiments, both matching threshold Thm and time threshold Tht may be part of the stopping criteria. Thm is the maximum value of the cost function L that is used to optimize the pose information T. Tht is the maximum value of computing time. If the value of the cost function L exceeds Thar, or the computing time exceeds Tht, the optimization process may be stopped (see step S512).

In step S506, positioning server 180 may generate a first 3-D representation of the point cloud frame $PC_1$ and a second 3-D representation of the high definition map at the selected resolution based on the initial pose information $T_0$. In some embodiments, to generate the 3-D representation, 3-D representation generation unit 210 may divide the 3-D space of the point cloud data into a number of voxels 320 as illustrated in FIG. 3. Each voxel is characterized by a set of voxel values, including, e.g., the local 3-D surface feature distributions, an average intensity value, and its 3-D distributions along the x, y, and z directions.

In step S508, the voxel value distributions of the 3-D representations at the selected resolution may be determined. In some embodiments, the 3-D distribution of the voxel values (e.g., the intensity values) may be a Gaussian/Normal distribution, characterized using Equations (1)-(3):

$$\mu = \frac{1}{n}\sum_{i=1}^{i=n} p_i \quad (1)$$

$$M = [p_1 - \mu \ \ldots \ p_n - \mu] \quad (2)$$

$$\sum = \frac{1}{n-1}MM^T \quad (3)$$

where $p_i$ is the 3-D coordinates of point i inside its voxel and intensity value at point i, $\mu$ is the average value of the Gaussian distribution $N(\mu, \Sigma)$, and $\Sigma$ is the variance of the Gaussian distribution.

In step S510, positioning sensor 180 may compute a similarity between the voxel value distributions of the two 3-D representations. For example, a similarity L can be determined using Equation (4):

$$L(S|T, M) = \sum_{i}^{N-1} \exp\frac{-(p_i - \mu_i)^t \sum_i^{-1}(p_i - \mu_i)}{2} \quad (4)$$

where $\mu_i$ and $\Sigma_i$ are the mean vectors and variance matrices, respectively, of the Gaussian distributions of the voxels. Pose information T is optimized by maximizing this similarity.

In some embodiments, iterative methods, such as a Newton iterative method, may be implemented for solving the optimization problem. During each iteration, the value of the cost function (e.g., L) and the computing time will be tracked. In step S512, if the value of the cost function L exceeds Thm, or the computing time exceeds Tht (S508: Yes), the stopping criteria are considered as satisfied and iterative process is considered converged. Accordingly, voxel matching unit 212 stops the optimization and provides the most updated pose information T as the optimized pose to positioning unit 214.

On the other hand, if neither L>Thm nor T>Tht is satisfied (S508: No), method 500 proceeds to S514 to further update pose T. In some embodiments, pose T ma be refined to further reduce the difference between the 3-D representations of the point cloud frame and the high definition map. With the updated pose T, method 500 returns to step S506 for another iteration. For example, in steps S506 and S508, positioning server 180 may generate 3-D representations of the point cloud frame and the high definition map and determines the voxel value distributions based on the most updated pose T.

Referring back to FIG. 4, in step S410, it is determined whether all resolutions are processed. If not (S410: No), method 400 returns to S406 to select the next lowest resolution for voxel matching. For example, after resolution $R_1$ is processed, resolution $R_2$ becomes the next lowest resolution and can be selected in step S406. Accordingly, the first and second 3-D representations at resolution $R_2$ may be compared and matched in step S408 to determine the optimized pose T at the selected resolution.

If all the resolutions are processed (S410: Yes), method 400 proceeds to step S412 to filter and merge the optimized pose information T of point cloud frame $PC_1$ with the corresponding initial pose data $IP_1$. For example, positioning server 180 may filter and merge the point cloud pose information T and initial pose data 203 using an UKF method to obtain the merged pose information T'. In step S414, vehicle 100 can be positioned in the high definition map based on the merged pose information T'.

In some embodiments, the merged pose information T' may be additionally utilized to provide estimated pose information for the next point cloud frame. For example, if merged pose information T' obtained in step S412 corresponds to point cloud frame $PC_1$ captured at time point $t_1$, positioning server 180 may estimate the pose information for point cloud frame $PC_2$ captured at the next time point $t_2$. The estimated pose information can be provided as the initial guess of pose $T_0$ for finding the optimized pose information T corresponding to point cloud frame $PC_2$.

In some embodiments, pose information estimation unit 216 may estimate the pose information based on a pose change between point cloud frame $PC_2$ and point cloud frame $PC_1$ captured at time points $t_1$ and $t_2$, respectively. For example, pose information estimation unit 216 may calculate the pose change based on the 3-D coordinates of the points and their associated attributes (e.g., reflected laser intensity) in each point cloud frame. In one example, four-dimensional (4-D) Normal Distributions Transform (NDT) may be used to calculate the pose change based on X, Y, and Z coordinates and the reflected layer intensities of each point. The 4-D NDT transfers the discrete set of 3-D points reconstructed from a single point cloud frame into a piece-wise continuous and differentiable probability density defined in the 3-D space. The probability density may consist of a set of normal distributions that can be easily calculated. The probability density distribution may be used to represent the point cloud pose information of the corresponding point cloud frame. As another example, pose information estimation unit 216 may calculate the pose change between initial pose data $IP_1$ and $IP_2$ captured at time points $t_1$ and $t_2$, respectively.

Another aspect of the disclosure is directed to a non-transitory computer-readable medium storing instructions which, when executed, cause one or more processors to perform the methods, as discussed above. The computer-readable medium may be volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for positioning a vehicle, comprising:
a communication interface configured to receive a point cloud with respect to a scene captured by a sensor equipped on the vehicle;
a storage configured to store the point cloud and a high definition map; and
a processor configured to:
create a first 3-D representation of the point cloud at a first resolution and another first 3-D representation of the point cloud at a second resolution, wherein the first resolution is lower than the second resolution;
create a second 3-D representation of the high definition map with respect to the scene at the first resolution and another second 3-D representation of the high definition map with respect to the scene at the second resolution;
determine pose information by comparing the first 3-D representation at the first resolution and the second 3-D representation at the first resolution;
refine the pose information by comparing the first 3-D representation at the second resolution and the second 3-D representation at the second resolution; and
determine a position of the vehicle based on the pose information.

2. The system of claim 1, wherein the sensor is a LiDAR.

3. The system of claim 1, wherein comparing the first 3-D representation and the second 3-D representation at the first resolution or the second resolution includes comparing voxels of the first 3-D representation with corresponding voxels of the second 3-D representation.

4. The system of claim 1, wherein the processor is further configured to:
determine a first voxel value distribution of each first 3-D representation;
determine a second voxel value distribution of each second 3-D representation; and
compare each first voxel value distribution with each corresponding second voxel value distribution.

5. The system of claim 1, wherein the communication interface is further configured to receive acquired pose information of the vehicle from a positioning sensor equipped on the vehicle, wherein the processor is further configured to refine the pose information using the acquired pose information.

6. The system of claim 5, wherein to refine the pose information using the acquired pose information, the processor is configured to apply a filter to the acquired pose information and the determined pose information.

7. The system of claim 6, wherein the filter is an Unscented Kalman Filter (UKF).

8. The system of claim 1, wherein the processor is further configured to create the first 3-D representation of the point cloud at the first resolution or the second resolution based on initial pose information, wherein the initial pose information is estimated based on pose information corresponding to a previous position of the vehicle.

9. The system of claim 1, wherein the processor is further configured to:
update the pose information to increase a similarity between each first 3-D representation and each corresponding second 3-D representation.

10. A method for positioning a vehicle, comprising:
receiving a point cloud with respect to a scene captured by a sensor equipped on the vehicle;
creating, by a processor, a first 3-D representation of the point cloud at a first resolution and another first 3-D representation of the point cloud at a second resolution, wherein the first resolution is lower than the second resolution;
creating, by the processor, a second 3-D representation of a high definition map with respect to the scene at the first resolution and another second 3-D representation of the high definition map with respect to the scene at the second resolution;
determining, by the processor, pose information of the vehicle by comparing the first 3-D representation at the first resolution and the second 3-D representation at the first resolution;
refining the pose information by comparing the first 3-D representation at the second resolution and the second 3-D representation at the second resolution; and
determining a position of the vehicle based on the pose information.

11. The method of claim 10, wherein comparing the first 3-D representation and the second 3-D representation at the first resolution or the second resolution includes comparing voxels of the first 3-D representation with corresponding voxels of the second 3-D representation.

12. The method of claim 10, further comprising:
determining a first voxel value distribution of each first 3-D representation;
determining a second voxel value distribution of each second 3-D representation; and
comparing each first voxel value distribution with each corresponding second voxel value distribution.

13. The method of claim 10, further comprising:
receiving acquired pose information of the vehicle; and
refining the pose information using the acquired pose information.

14. The method of claim 13, wherein refining the pose information using the acquired pose information further includes applying a Kalman filter to the acquired pose information and the determined pose information.

15. The method of claim 10, further comprising creating the first 3-D representation of the point cloud at the first resolution or the second resolution based on initial pose information, wherein the initial pose information is estimated based on pose information corresponding to a previous position of the vehicle.

16. The method of claim 10, further comprising:
updating the pose information to increase a similarity between each first 3-D representation and each corresponding second 3-D representation.

17. A non-transitory computer-readable medium having instructions stored thereon that, when executed by one or more processors, causes the one or more processors to perform operations comprising:
receiving a point cloud with respect to a scene captured by a sensor equipped on the vehicle;
creating a first 3-D representation of the point cloud at a first resolution and another first 3-D representation of the point cloud at a second resolution, wherein the first resolution is lower than the second resolution;
creating a second 3-D representation of a high definition map with respect to the scene at the first resolution and another second 3-D representation of the high definition map with respect to the scene at the second resolution;
determining pose information of the vehicle by comparing the first 3-D representation at the first resolution and the second 3-D representation at the first resolution;
refining the pose information by comparing the first 3-D representation at the second resolution and the second 3-D representation at the second resolution; and
determining a position of the vehicle based on the pose information.

18. The computer-readable medium of claim 17, wherein the operations further comprise:
determining a first voxel value distribution of each first 3-D representation;
determining a second voxel value distribution of each second 3-D representation; and
comparing each first voxel value distribution with each corresponding second voxel value distribution.

* * * * *